UNITED STATES PATENT OFFICE.

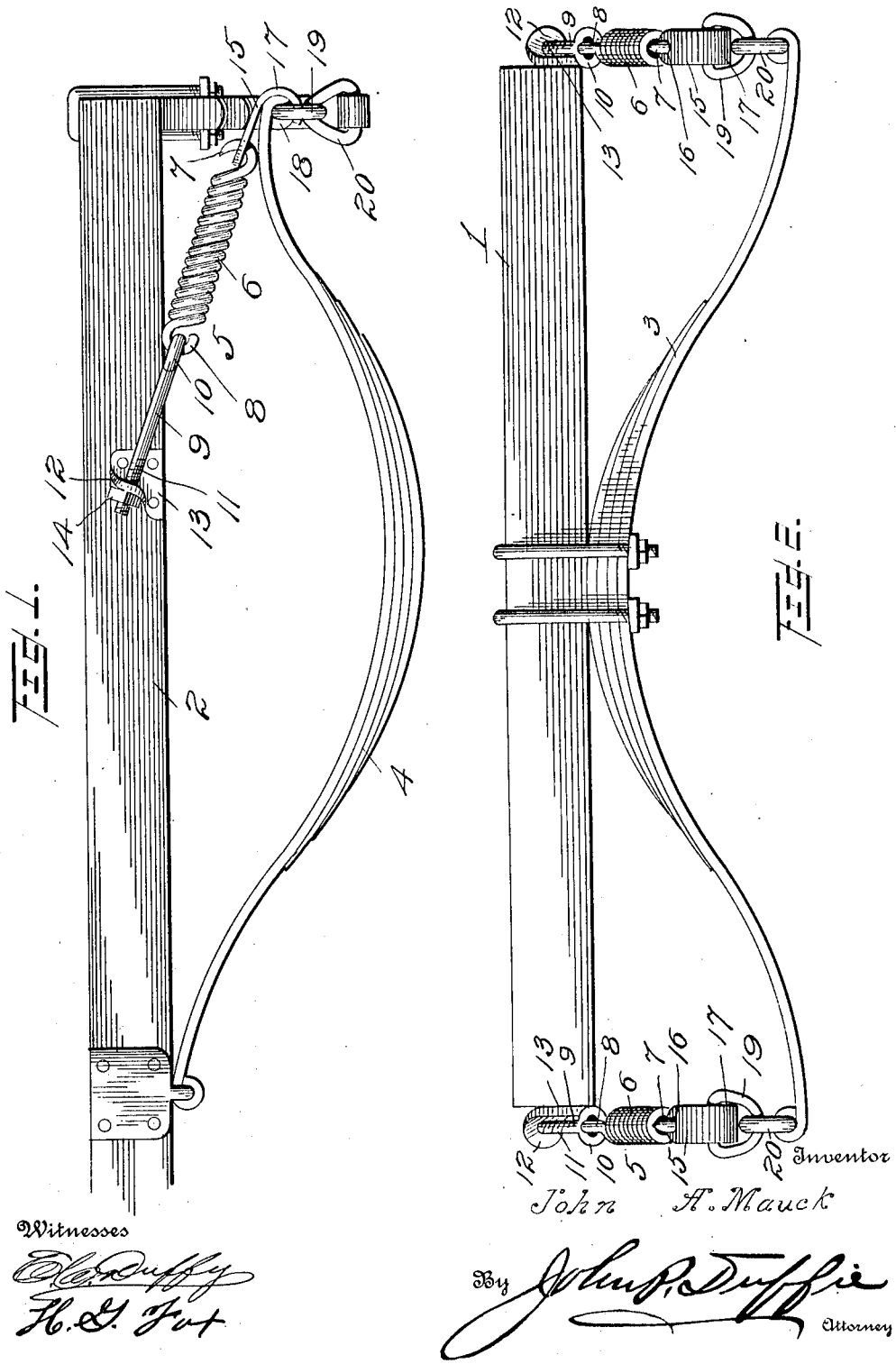

JOHN A. MAUCK, OF PRINCETON, INDIANA.

SUPPLEMENTARY SPRING ATTACHMENT AND SHOCK-ABSORBER FOR AUTOMOBILES.

1,020,043.   Specification of Letters Patent.   Patented Mar. 12, 1912.

Application filed August 9, 1911. Serial No. 643,165.

*To all whom it may concern:*

Be it known that I, JOHN A. MAUCK, a citizen of the United States, residing at Princeton, in the county of Gibson and State of Indiana, have invented certain new and useful Improvements in Supplementary Spring Attachments and Shock-Absorbers for Automobiles, of which the following is a specification.

This invention relates to a supplementary spring attachment and shock absorber for automobiles.

The primary objects of this invention are. first, to provide a form of spring which will retain its life for a much longer time than the ordinary compression spring, second, to provide a spring of the tension type which may expand to any required limit and third, to provide a spring attachment which will sustain a part of the weight of the car and will not wrench during a shock.

Other objects of the invention will appear as the nature of the invention is better understood, reference being had to the accompanying drawings, in which—

Figure 1 is a side elevation of the rear end of the frame of an automobile with the spring attachment applied, and Fig. 2 is a rear end view of Fig. 1.

Referring to the drawings for a more particular description of the invention, 1 indicates the cross piece, and 2 the side pieces of the rear end of an automobile frame.

3 and 4 indicate the end and side springs, usually provided to sustain the weight of the car and to absorb any shocks that may be incurred. The springs 3 and 4, however, do not entirely fulfil these requirements and for this reason, I provide the supplementary spring attachments 5 which are arranged at opposite sides of the frame and are disposed at a slight upward inclination with a horizontal plane. Each attachment, as shown, comprises a spiral tension or expanding spring 6 provided at opposite ends with the hooks 7 and 8. The front end of the spring 6 is adjustably connected with the adjacent side piece of the frame 6 by the bolt 9, the eye 10 of which is engaged with the hook 8 of the spring and the threaded end 11 of which passes through a corresponding opening in an ear or lug 12 formed by bending one corner of the metal attaching plate 13 outwardly at right angles, the attaching plate being riveted to the side member 2 of the frame. A nut 14 screws on the threaded end of the eye bolt 9 and bears against the ear or lug 12, said nut affording means for the adjustment of the eye bolt and spring. The opposite ends of the springs 6 are connected with the ends of the spring 3 by the clevises 15, the front ends of which are provided with apertures 16 to receive the hooked ends 7 of the springs and the opposite ends of which are provided with the hooks 17 which engage and fit over the bent ends 18 of the side springs 4, said ends 18 of the springs 4 being connected with the opposite ends of the spring 3 by the links 19 and 20.

From the foregoing description taken in connection with the drawings, it will be clear that the weight borne by the vehicle will cause the spring 3 to straighten out or lengthen with the result that a pull is exerted upon the coil springs 6, expanding the latter to a more or less extent, depending on the weight to be borne. In this way, the springs 6 sustain part of the weight of the vehicle and its passengers and being of the tension or expanding type, the springs will not break or the resilient action will not be brought to a sudden stop, as in the case of compression springs when the coils entirely close. In like manner, the supplementary springs will act as a shock absorber.

Another feature of importance is the angle at which the springs 6 are arranged. When the body of the car descends, and the spring 3 is extended or straightened out, the strain on the supplementary springs will be in an almost horizontal position. The springs 6 will therefore contract or expand in a smooth and easy manner, and there is none of the quick re-action that would be present with perpendicular springs.

From the foregoing description taken in connection with the drawings, it is thought that the construction and advantages of this invention will be readily understood without requiring a more extended explanation.

Having described my invention what I claim as new and desire to secure by Letters Patent, is:

1. In combination with the rear end of an automobile frame and its supporting springs, a supplementary spring attachment comprising a pair of coil springs arranged at opposite sides of the frame, said springs being arranged longitudinally of the frame and extending at a slight upward inclination with a horizontal plane, means for adjustably connecting the front or upper ends of the springs with the side pieces of the vehicle frame and means for connecting the opposite ends of the springs with the ends of the rear end spring of the frame, the coil springs being adapted to expand as the rear end spring is depressed, whereby the former coöperates with the latter to sustain the weight of the vehicle and to absorb shocks.

2. In combination with a rear end of an automobile frame, and its end and side supporting springs, a supplementary spring attachment and shock absorber comprising a pair of coil springs arranged at opposite sides of the frame and provided at their opposite ends with hooks, said springs being disposed longitudinally of the frame and extending at an inclination with a horizontal plane, attaching plates secured to the side pieces of the frame and provided with outwardly bent apertured ears or lugs, eye bolts connected with the upper hooked ends of the springs with their threaded ends passing through the aperture of said ears or lugs, nuts screwing on the threaded ends of the bolts against the ears or lugs of the attaching frame for adjusting the bolts and springs and clevises connected with the lower hooked ends of the springs and provided with hooked portions to engage or fit over the rear ends of the side springs.

In testimony whereof I affix my signature in presence of two witnesses.

JOHN A. MAUCK.

Witnesses:
L. J. OTTO,
OSCAR CLARK.

Copies of this patent may be obtained for five cents each, by addressing the "Commissioner of Patents, Washington, D. C."